Patented May 12, 1953

2,638,451

UNITED STATES PATENT OFFICE 2,638,451

PROCESS FOR RESOLVING EMULSIONS USING AZOLIDINE SALTS OF ALKYLATED NAPHTHALENE SULFONIC ACIDS

William B. Hughes, Bartlesville, Okla., assignor to Cities Service Oil Company, Bartlesville, Okla., a corporation of Delaware No Drawing. Application January 31, 1950,
Serial No. 141,598

8 Claims. (Cl. 252—338)

1

This invention relates to surface active compounds, and more particularly to compounds effective to cause a rapid and complete separation of the oil and water phases of a water-in-oil emulsion.

One of the most troublesome problems met with in crude oil production relates to the breaking of water-in-oil emulsions formed in wells producing both oil and brine. Unless these emulsions can be rapidly and completely broken, their oil content is lost. These emulsions will vary in properties from well to well and even from day to day in the same well, so that it may be necessary to use one demulsifier on one well, and another on an adjacent well, in order to secure optimum results.

It is an object of this invention to provide a series of compounds effective to rapidly resolve water-in-oil emulsions of the type commonly met with in crude oil production, to permit a complete recovery of the oil content of the emulsion.

It has been found that azolidines formed by the reaction of an aldehyde with a primary or secondary alkanol amine, neutralized with a propylated naphthalene sulfonic acid, are effective in breaking a wide variety of water-in-oil emulsions. These compositions will vary somewhat in properties depending upon the particular aldehyde or amine chosen as the starting material, so that it is possible, by proper selection of the aldehyde or amine, to tailor the composition to fit the individual emulsion which it is desired to break.

Among aldehydes which are suitable as starting materials for my new compositions may be mentioned formaldehyde, acetaldehyde, propionaldehyde, butyraldehyde, and higher aldehydes. I prefer, however, to use heptaldehyde, since I have found that the higher aldehydes give generally better results, and heptaldehyde is available commercially at a reasonable cost. Aldehydes higher than heptaldehyde may also be used, but are not preferred since their cost at the present time is such as to render them commercially unattractive.

As the amine, I prefer to use monoethanol amine or diethanol amine, since these amines are available commercially at low cost. Other alkanol amines, such as the propanol and butanol amines, and higher alkanol amines, may also be used.

The propylated naphthalene sulfonic acid which I use as the neutralizing agent for my intermediate compounds may be prepared according to the directions given by Walker in U. S.

2

Patent No. 1,873,165. The compound has the formula:

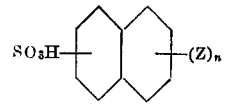

in which Z is an isopropyl radical, and $n$ is a whole number from 1 to 4.

Generally, in preparing my new demulsifiers, I prefer to mix the amine and aldehyde in approximately equimolar proportions, and then heat the mixture to force the reaction to completion and to drive the water formed in the reaction overhead. The reaction will proceed in accordance with the following general equation.

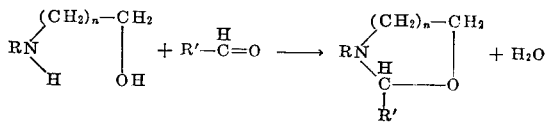

R being an alkanol radical or a hydrogen atom, and R' being an alkyl radical or a hydrogen atom. The product is then neutralized to a methyl orange end point with propylated naphthalene sulfonic acid to give a product having the following generic formula:

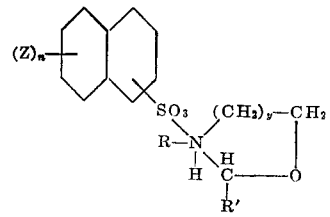

in which Z is an isopropyl radical, and $n$ is a whole number from 1 to 4.

In order that those skilled in the art may more fully appreciate the nature of my invention and the manner of carrying it out, the following example is given.

Example

Heptaldehyde and diethanol amine were mixed in the proportion of 114 grams of heptaldehyde and 105 grams of diethanol amine. The mixture was then heated at a temperature of about 150° C. until water ceased to evolve, the time necessary being about one hour, to yield a product having the formula

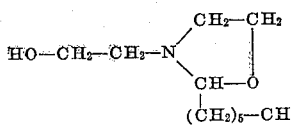

This product was then neutralized to a methyl orange end point with propylated naphthalene sulfonic acid.

The neutralized product may be used with success as a demulsifier in relatively pure form, but since it is rather viscous, and is difficult to inject into gathering lines during cold weather, it may be diluted to the desired viscosity with crude oil, other suitable hydrocarbon fractions, or other suitable solvents such as dichlorodiethyl ether, chloronaphthalene, ketones, or alcohols in amounts ranging from about 10 to about 60 per cent of the total mixture. The product may also be used in combination with other commercial demulsifiers in order to improve their characteristics.

The various compositions described above are effective to break a wide variety of emulsions, and are low in cost. While they are not uniformly successful in completely resolving every emulsion encountered in the oil fields, they may be advantageously utilized as an ingredient of a composite demulsifier which will resolve emulsions which the present compositions are incapable of completely resolving. For example, an emulsion which they are capable of breaking completely, but on which they show poor water separation action, may successfully be treated by adding to the composition from about 1 per cent to about 10 per cent of the water separation agents disclosed in my copending application Serial No. 141,597 filed concurrently herewith.

Having now described my invention, what is claimed as new and useful is:

1. The process of resolving emulsions including subjecting a petroleum water-in-oil emulsion to the action of a compound having the generic formula

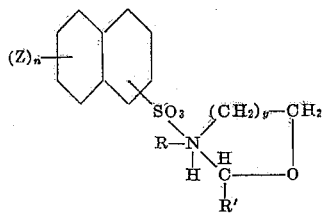

in which Z is an isopropyl radical, $n$ is a whole number from 1 to 4, $y$ is a whole number less than 4, R is a member of the class consisting of alkanol radicals and hydrogen atoms, and R′ is a member of the class consisting of alkyl radicals and hydrogen atoms.

2. The process of resolving emulsions including subjecting a petroleum water-in-oil emulsion to the action of a compound according to claim 1 in which R is an ethanol radical and $y$ is 1.

3. The process of resolving emulsions including subjecting a petroleum water-in-oil emulsion to the action of a compound according to claim 1 in which R is a hydrogen atom and $y$ is 1.

4. The process of resolving emulsions including subjecting a petroleum water-in-oil emulsion to the action of a compound according to claim 1 in which R′ is a hexyl radical.

5. The process of resolving emulsions including subjecting a petroleum water-in-oil emulsion to the action of a compound according to claim 1 in which R′ is a hexyl radical, R is an ethanol radical, and $y$ is 1.

6. The process of resolving emulsions including subjecting a petroleum water-in-oil emulsion to the action of a compound according to claim 1 in which R′ is a hexyl radical, R is a hydrogen atom, and $y$ is 1.

7. A demulsifying composition consisting essentially of from about 40 to about 90 parts by weight of a compound having the generic formula

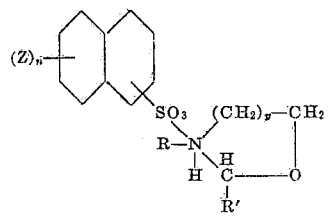

in which Z is an isopropyl radical, R is a member of the class consisting of alkanol radicals and hydrogen atoms, R′ is a member of the class consisting of alkyl radicals and hydrogen atoms, $n$ is a whole number from 1 to 4, and $y$ is a whole number less than 4; and from about 60 to about 10 parts by weight of a solvent selected from the group consisting of hydrocarbons, chlorinated hydrocarbons, ethers, ketones, and alcohols.

8. The composition according to claim 7 in which the solvent is a hydrocarbon fraction.

WILLIAM B. HUGHES.

References Cited in the file of this patent

UNITED STATES PATENTS

| Number | Name | Date |
|---|---|---|
| 2,110,837 | Blair | Mar. 8, 1938 |
| 2,226,118 | De Groote | Dec. 24, 1940 |
| 2,352,152 | Kaplan | June 20, 1944 |